US012747075B2

(12) United States Patent
Eisele et al.

(10) Patent No.: US 12,747,075 B2
(45) Date of Patent: Sep. 29, 2026

(54) SYSTEMS AND METHODS FOR INDICATING TAMPERING OF A CONTAINER

(71) Applicant: THE BOEING COMPANY, Arlington, VA (US)

(72) Inventors: Gregory Thomas Eisele, Seattle, WA (US); Sean Michael Flinn, Lake Stevens, WA (US); Derrick Brian Pruitt, Bothell, WA (US)

(73) Assignee: The Boeing Company, Arlington, VA (US)

( * ) Notice: Subject to any disclaimer, the term of this patent is extended or adjusted under 35 U.S.C. 154(b) by 580 days.

(21) Appl. No.: 18/327,972

(22) Filed: Jun. 2, 2023

(65) Prior Publication Data

US 2024/0400276 A1 Dec. 5, 2024

(51) Int. Cl.

| | |
|---|---|
| ***B65D 55/06*** | (2006.01) |
| ***B64D 11/06*** | (2006.01) |
| ***B65D 43/16*** | (2006.01) |
| ***B65D 51/24*** | (2006.01) |
| ***G08B 5/18*** | (2006.01) |

(52) U.S. Cl.

CPC .......... *B65D 55/06* (2013.01); *B64D 11/0631* (2014.12); *B65D 43/16* (2013.01); *B65D 51/243* (2013.01); *G08B 5/18* (2013.01); *B65D 2203/00* (2013.01); *B65D 2251/1066* (2013.01); *B65D 2401/05* (2020.05); *B65D 2543/00194* (2013.01)

(58) Field of Classification Search

CPC ...... B65D 55/06; B65D 43/16; B65D 51/243; B65D 2203/00; B65D 2251/1066; B65D 2401/05; B65D 2543/00194; B64D 11/0631; G08B 5/18; G08B 5/00

See application file for complete search history.

(56) References Cited

U.S. PATENT DOCUMENTS

| | | | | | |
|---|---|---|---|---|---|
| 3,556,575 | A * | 1/1971 | Farkas | B65D 63/1036 | 292/307 R |
| 4,299,417 | A * | 11/1981 | McClure | G09F 3/0358 | 292/320 |
| 4,782,977 | A * | 11/1988 | Watanabe | B65D 55/024 | 292/307 R |
| 5,568,951 | A * | 10/1996 | Morgan | B65D 55/02 | 292/307 A |
| 6,113,163 | A * | 9/2000 | Liroff | E05B 13/002 | 292/307 R |

(Continued)

FOREIGN PATENT DOCUMENTS

| | | | | |
|---|---|---|---|---|
| GB | 2546086 A | * | 7/2017 | B64D 11/0643 |

*Primary Examiner* — Kristina M Deherrera
*Assistant Examiner* — Tania Courson
(74) *Attorney, Agent, or Firm* — Joseph M. Butscher; Carroll, Hoette & Butscher, LLC

(57) ABSTRACT

A system for indicating tampering of a container (such as a life vest box within an internal cabin of a vehicle) includes a base configured to be secured to a door of the container. A retainer is configured to be secured to a portion of a housing of the container. A tamper indicator includes a flag coupled to the base, and a tether extending from the flag. The tether is coupled to the retainer. The tether includes a weakened area that is configured to break to separate the flag from the base in response to the door of the container being opened.

20 Claims, 8 Drawing Sheets

(56) References Cited

U.S. PATENT DOCUMENTS

| | | | | |
|---|---|---|---|---|
| 6,888,241 | B1 * | 5/2005 | Korn | G09F 3/0347<br>257/730 |
| 6,960,110 | B2 * | 11/2005 | Hough | B63C 9/22<br>441/80 |
| 8,496,291 | B2 * | 7/2013 | Lamoree | B64D 11/0631<br>244/118.6 |
| 10,494,099 | B2 * | 12/2019 | Wickham | B64D 11/0631 |
| 10,556,687 | B2 * | 2/2020 | Flinn | B64D 11/0631 |
| 10,577,063 | B2 * | 3/2020 | Schalla | B65D 77/20 |
| 10,640,269 | B2 * | 5/2020 | Lumsden | B65D 55/026 |
| 10,683,068 | B2 * | 6/2020 | Schalla | B64D 11/0631 |
| 11,124,278 | B2 * | 9/2021 | Aruga | B64D 11/0631 |
| 11,352,141 | B2 * | 6/2022 | White | A45C 13/30 |
| 12,136,010 | B2 * | 11/2024 | Cotte | G06K 19/07798 |
| 2010/0265068 | A1 * | 10/2010 | Brackmann | G01S 19/48<br>340/572.1 |
| 2017/0225790 | A1 * | 8/2017 | Ball | B65D 33/34 |
| 2019/0233121 | A1 * | 8/2019 | Wunderlich | B64D 11/0631 |
| 2020/0372318 | A1 * | 11/2020 | Bryant | H04B 5/77 |
| 2024/0400275 | A1 * | 12/2024 | Flinn | B64D 11/0631 |

* cited by examiner

SYSTEMS AND METHODS FOR INDICATING TAMPERING OF A CONTAINER

FIELD OF THE DISCLOSURE

Examples of the present disclosure generally relate to systems and methods for indicating tampering of a container, such as a life vest box secured to a seat within an internal cabin of an aircraft.

BACKGROUND OF THE DISCLOSURE

Commercial aircraft are used to transport passengers between various locations. Typically, each passenger seat within an internal cabin is equipped with a life preserver vest ("life vest") stored in a box mounted underneath a seat pan, cushion, or the like. Certain regulations, such as promulgated by the United States Federal Aviation Administration (FAA), require that life preservers or storage locations for life vests must be designed so that tampering is evident.

In general, life vest boxes are required to be easily visible after installation, and include an indication of tampering. Further, manipulation of an indication of tampering to make it appear as it has not been tampered must be prevented.

Known security devices for life vest boxes include plastic padlocks, and plastic stickers. Both types provide security. However, the padlocks typically require a piece of plastic to be broken (for example, sheared), which increases the difficulty of opening a door of the life vest box. In contrast, the stickers offer little resistance to opening the door of the life vest box, but may not provide clear and readily visible of tampering.

SUMMARY OF THE DISCLOSURE

A need exists for an efficient and effective system and method for indicating tampering of a container, such as a life vest box within an internal cabin of a vehicle.

With that need in mind, certain examples of the present disclosure provide a system for indicating tampering of a container. The system includes a base configured to be secured to a door of the container. A retainer is configured to be secured to a portion of a housing of the container. A tamper indicator includes a flag coupled to the base, and a tether extending from the flag. The tether is coupled to the retainer. The tether includes a weakened area that is configured to break to separate the flag from the base in response to the door of the container being opened.

In at least one example, the base is configured to be secured to a front face of the door of the container. In at least one example, the portion of the housing of the container is an outer surface of a top wall of the housing.

In at least one example, the flag coupled to the base provides an undisturbed indication. Conversely, the base without the flag provides a tampered indication.

In at least one example, the container is a life vest box for an internal cabin of a vehicle. The life vest box can be secured to a seat within the internal cabin.

In at least one example, the base includes a panel, and retaining cuffs outwardly extending from the panel. Each of the retaining cuffs includes an extension beam outwardly extending from the panel, and a retainer beam downwardly extending from the extension beam. A slot is defined between the panel, the extension beam, and the retainer beam. A passage separates the retaining cuffs. The flag is secured by the panel and the retaining cuffs, and a portion of the tether extends upwardly through the passage. In at least one example, a front face of the panel includes an indication message denoting tampering.

In at least one example, the retainer includes a tether housing having an inlet channel and an outlet channel opposite from the inlet channel. A portion of the tether is secured within the tether housing.

In at least one example, the tether includes a ratchet segment. The ratchet segment is configured to be moveably secured to the retainer. The ratchet segment includes teeth that cooperate with reciprocal teeth of the retainer.

Certain examples of the present disclosure provide a container including a housing defining an internal compartment for storing one or more items. A door is moveably coupled to the container. The door is configured to be moved from a closed position, in which the internal compartment is closed, and an open position, in which the internal compartment is accessible. The container also includes a system for indicating tampering of the container, as described herein.

Certain examples of the present disclosure provide a vehicle including an internal cabin, a seat within the internal cabin, and a life vest box secured to the seat. The life vest box includes a housing defining an internal compartment for storing a life vest. A door is moveably coupled to the life vest box. The door is configured to be moved from a closed position, in which the internal compartment is closed, and an open position, in which the internal compartment is accessible. The vehicle also includes a system for indicating tampering of the life vest box, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
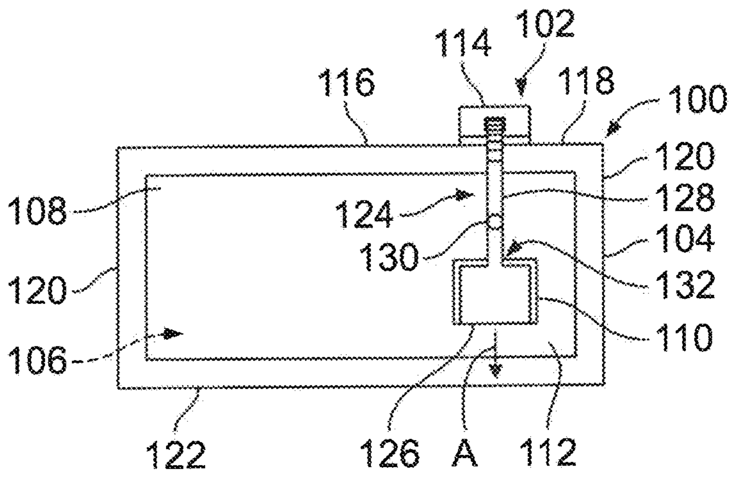
FIG. 1 illustrates a simplified front view of a container having a system for indicating tampering, according to an example of the present disclosure.

FIG. 1 illustrates a simplified front view of a container 100 having a system 102 for indicating tampering, according to an example of the present disclosure. The container 100 includes a housing 104 defining an internal compartment 106 for storing one or more items. A door 108 is moveably coupled to the container 100 and is configured to be moved from a closed position, in which the internal compartment 106 is closed, and an open position, in which the internal compartment 106 is accessible.

In at least one example, the system 102 is separately formed from the container 100, and is mounted onto the container 100, such as by one or more fasteners, adhesives, and/or the like. In at least one other example, the system 102 is integrally formed with the portions of the container 100.

The system 102 includes a base 110 secured on a front face 112 of the door 108, and a retainer 114 secured on an outer surface 116 of a top wall 118 of the housing 104. Optionally, the retainer 114 can be secured on a lateral wall 120 or a bottom wall 122 of the housing 104. The system 102 also includes a tamper indicator 124 coupled to the base 110 and the retainer 114.

The tamper indicator 124 includes a flag 126 and a tether 128 extending from the flag 126. The tether 128 includes a weakened area 130, such as one or more perforations, a cut, a recessed area, a thinned location, and/or the like. The flag 126 is disposed within the base 110, and the tether 128 extends upwardly through a passage 132 of the base 110. The tether 128 extends upwardly over the front face 112 of the door 108 and is secured by the retainer 114. In at least one example, the tether 128 can abut into (and/or extend parallel to) the front face 112 such that there is no slack in the tether 128 between the base 110 and the retainer 114.

In operation, when the door 108 is closed and the tamper indicator 124 is initially secured to the base 110 and the retainer 114, the tether 128 securely holds the flag 126 within the base 110. The flag 126 being visible within the base 110 provides an indication that the container 100 has not been opened, and therefore the contents therein have not been disturbed. Thus, the flag 126 visible within the base 110 provides an undisturbed indication.

In contrast, when the door 108 is opened, the tether 128 outwardly bends and breaks at the weakened area 130. As the tether 128 breaks at the weakened area 130, the flag 126 falls downwardly out of the base 110 in the direction of arrow A. As such, the flag 126 is no longer within the base 110. The flag 126 out of the base 110 (that is, the base 110 having no flag 126) indicates that the container 100 has been opened, and that the contents therein may have been disturbed. In this manner, the base 110 without the flag 126 provides a tampered indication.

In at least one example, the container 100 is a life vest box for an internal cabin of a vehicle. In this example, the item stored within the compartment 106 is a life vest. As another example, the container 100 is a stowage bin assembly within an internal cabin of a vehicle. In such an example, the container 100 can store an item such as a fire extinguisher, self-defense devices, and/or the like. As another example, the container 100 is a closet. As another example, the container 100 is a safe box, which can be used to store items such as valuables, guns, and/or the like. The aforementioned examples are non-limiting. The container 100 can be used in various environments and settings, in which there is a need to evince potential tampering.

As described herein, the system 102 for indicating tampering of the container 100 includes the base 110 base configured to be secured to the front face 112 of the door 108 of the container 100. The retainer 114 is configured to be secured to a portion of the housing 104 (such as on the outer surface 116 of the top wall 118) of the container 100. The tamper indicator 124 includes the flag 126 coupled to the base 110, and the tether 128 extending from the flag 126. The tether 128 is coupled to the retainer 114. The tether 128 includes the weakened area 130 that is configured to break to separate the flag 126 from the base 110 in response to the door 108 of the container 100 being opened.

Figure 2:
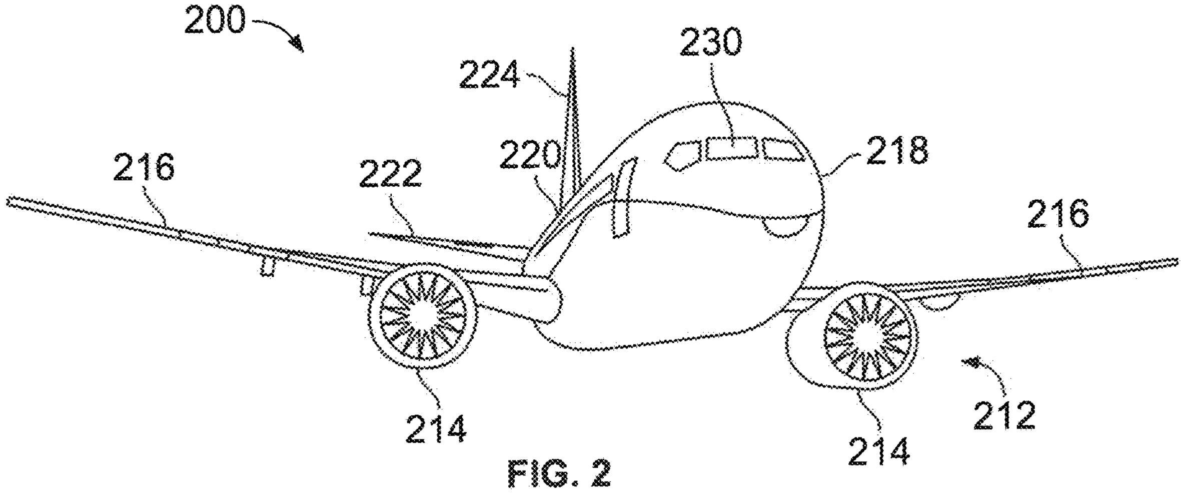
FIG. 2 (Prior Art)
FIG. 2 illustrates a perspective front view of an aircraft.

FIG. 2 illustrates a perspective front view of an aircraft 200. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like.

Referring to FIGS. 1 and 2, the container 100 having the system 102 can be used within the internal cabin 230. For example, the container 100 can be a life vest box secured to a seat within a passenger section of the internal cabin 230.

Optionally, instead of an aircraft, examples of the present disclosure may be used with various other vehicles, such as automobiles, buses, locomotives and train cars, watercraft, and the like. Also, optionally, instead of a vehicle, examples of the present disclosure can be used with fixed structures, such as commercial and residential buildings.

Figure 3:
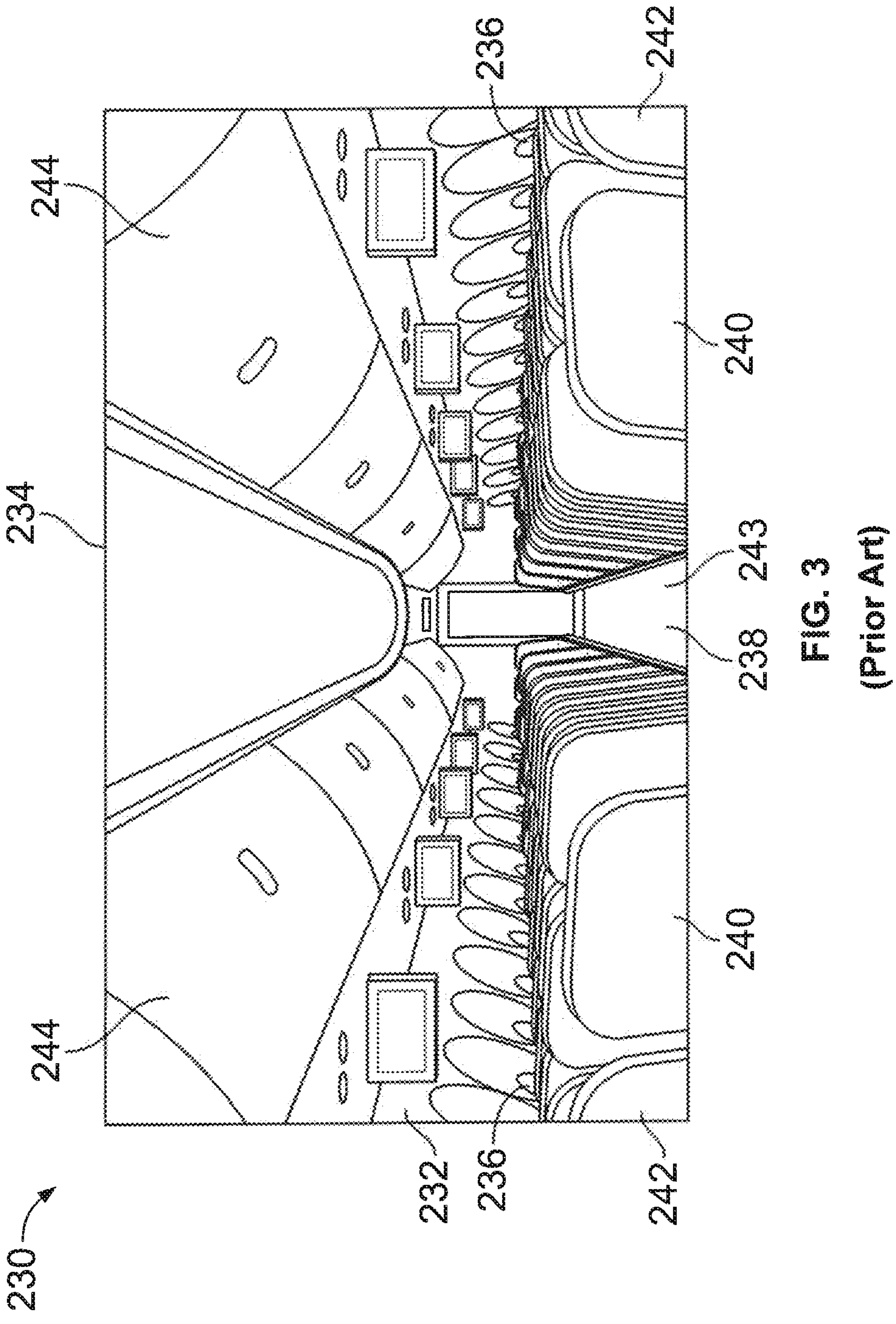
FIG. 3 (Prior Art)
FIG. 3 illustrates a perspective interior view of an internal cabin of an aircraft.

FIG. 3 illustrates a perspective interior view of an internal cabin 230 of an aircraft. The internal cabin 230 includes outboard walls 232 and a ceiling 234. Windows 236 may be formed within the outboard walls 232. A floor 238 supports rows of seats 240. As shown in FIG. 3, a row 242 may include three seats 240 on either side of an aisle 243. However, the row 242 may include more or fewer seats 240 than shown. Additionally, the internal cabin 230 may include more aisles than shown.

Referring to FIGS. 1-3, in at least one example, the container 100 is secured to a seat 240 within the internal cabin 230. As another example, the container 100 can be a stowage bin assembly 244, which can be above one or more seats 240.

Figure 4:
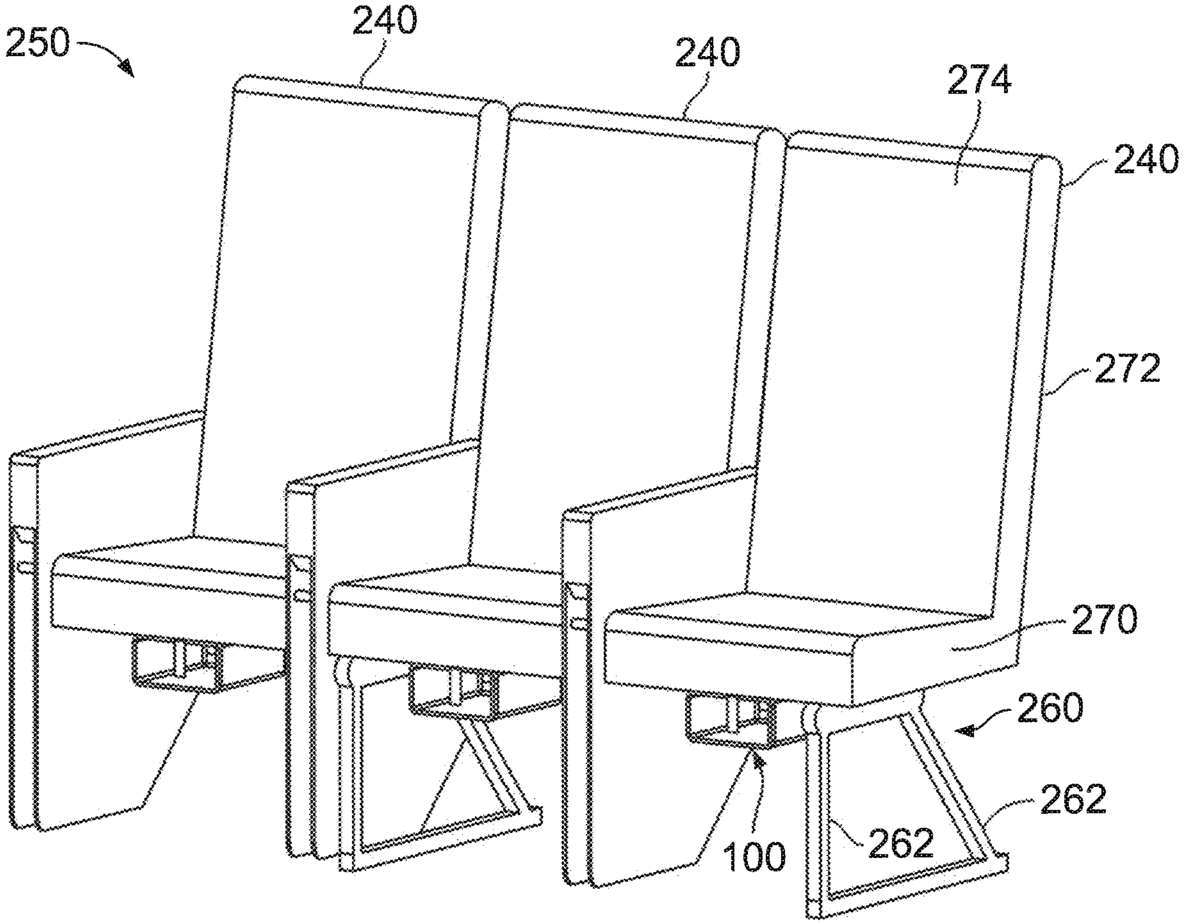
FIG. 4 (Prior Art)
FIG. 4 illustrates an isometric front view of a seating system.

FIG. 4 illustrates an isometric front view of a seating system 250. The seating system 250 includes plural seats 240, which are configured to be disposed within the internal cabin 230 (shown in FIGS. 2 and 3). The seat system 250 can include more or fewer seats 240 than shown.

The seats 240 include a base 260, which may include legs 262 that may be secured to seat tracks within an internal cabin. In at least one example, securing studs (such as shear studs) downwardly extend from lower surfaces of the base

260. The securing studs are securely retained within the seat tracks of the floor 238. The seat tracks are configured to securely couple to the securing studs to secure the seat 240 in place. The base 260 supports a seat pan 270 and a backrest 272, which includes a headrest 274. Armrests may be pivotally secured to the backrest 272.

The seats 240 may be sized and shaped differently than shown in FIG. 4. The seats 240 may include more or fewer components than shown in FIG. 4. It is to be understood that the seats 240 shown in FIG. 4 are merely examples of seats that may be disposed within an internal cabin of a vehicle.

In at least one example, the container 100 is secured to the seat 240. For example, the container 100 is mounted to an underside of the seat pan 270. In this example, the container 100 is a life vest box configured to store a life vest.

Figure 5:
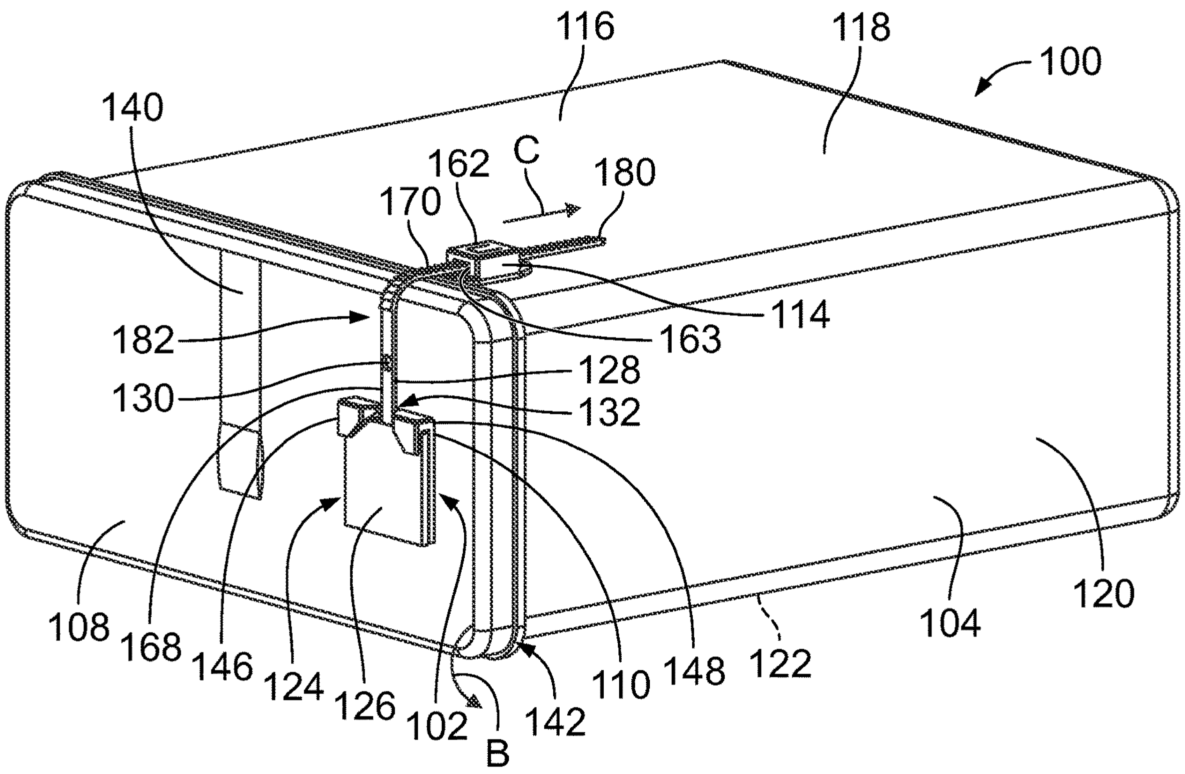
FIG. 5 illustrates an isometric side view of the container having the system for indicating tampering, according to an example of the present disclosure.

FIG. 5 illustrates an isometric side view of the container 100 having the system 102 for indicating tampering, according to an example of the present disclosure. The container 100 shown in FIG. 5 is a life vest box for use within an internal cabin of a vehicle. The container 100 can include a pull strap 140 that is configured to be pulled outwardly to open the door 108 about a pivot axis 142 in the direction of arc B.

Figure 6:
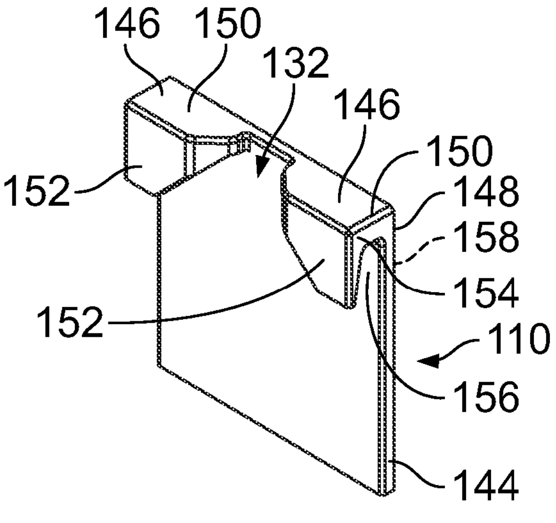
FIG. 6 illustrates an isometric front view of a base, according to an example of the present disclosure.

FIG. 6 illustrates an isometric front view of the base 110, according to an example of the present disclosure. The base 110 includes a panel 144. Retaining cuffs 146 outwardly extend from an upper edge 148 of the panel 144. Each retaining cuff 146 includes an extension beam 150 that outwardly extends from the upper edge 148, such as at a right angle. In at least one example, the extension beam 150 is orthogonal to the panel 144. A retainer beam 152 downwardly extends from an outer edge 154 of the extension beam 150, such as at a right angle. In at least one example, the retainer beam 152 is orthogonal to the extension beam 150, and parallel with the panel 144. A slot 156 is defined between the panel 144, the extension beam 150, and the retainer beam 152. As shown, two opposed retaining cuffs 146 are separated by the passage 132.

Referring to FIGS. 1, 5, and 6, the base 110 is secured to the front face 112 of the door 108. For example, a rear surface 158 of the base 110 is secured to the front face 112, such as through one or more fasteners, an adhesive, and/or the like. Optionally, the base 110 can be integrally molded and formed with the door 108.

Figure 7:
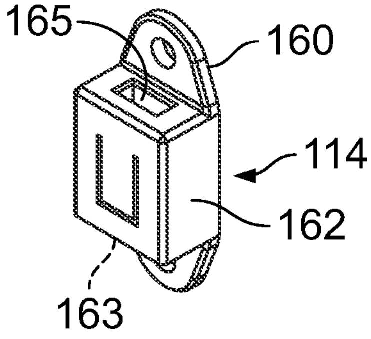
FIG. 7 illustrates an isometric top view of a retainer, according to an example of the present disclosure.

FIG. 7 illustrates an isometric top view of the retainer 114, according to an example of the present disclosure. The retainer 114 includes a mounting base 160, and a tether housing 162 outwardly extending from the mounting base 160. The tether housing 162 has an inlet channel 163 and an outlet channel 165 opposite from the inlet channel 163.

Referring to FIGS. 1, 5, and 6, the mounting base 160 is secured to the outer surface 116 of the top wall 118, such as through one or more fasteners, adhesives, and/or the like. Optionally, the retainer 114 can be integrally molded and formed with the top wall 118 (or optionally, a lateral wall 120, or the bottom wall 122).

Figure 8:
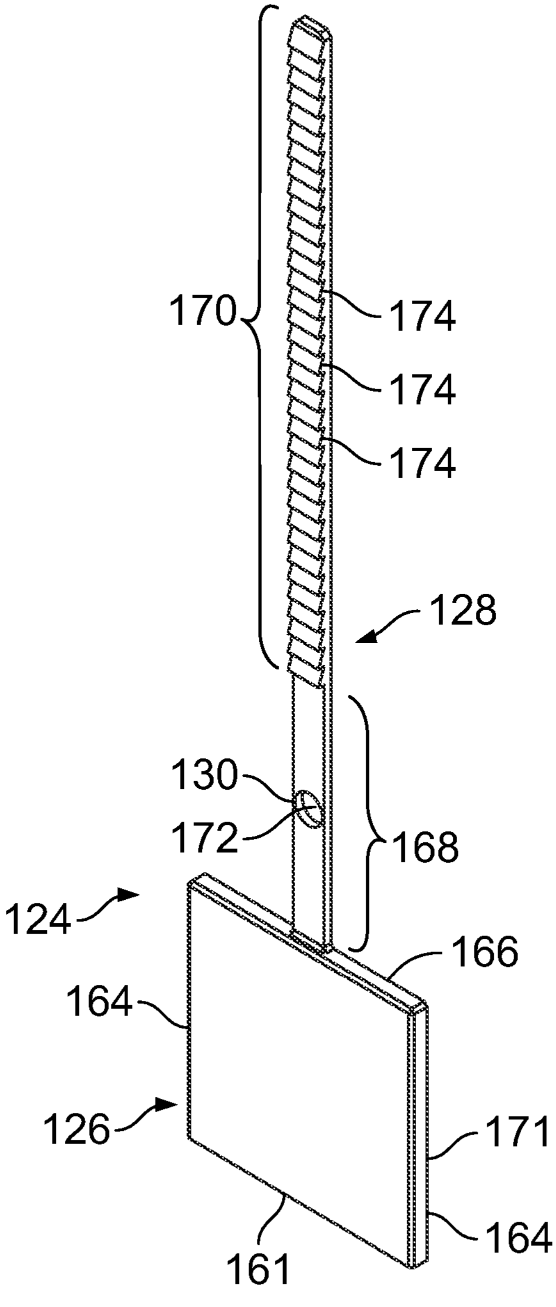
FIG. 8 illustrates an isometric front view of a tamper indicator, according to an example of the present disclosure.

FIG. 8 illustrates an isometric front view of the tamper indicator 124, according to an example of the present disclosure. The tamper indicator 124 includes the flag 126 and the tether 128. The flag 126 includes a planar tab 171 having a bottom edge 161 connected to lateral edges 164, which are connected to a top edge 166. The tab 171 is configured to be secured on and/or within the base 110 (shown in FIGS. 1, 5, and 6).

The tether 128 extends upwardly from the top edge 166. The tether 128 includes an extension segment 168 and a ratchet segment 170 extending from the extension segment 166 opposite from the tab 171. The extension segment 168 includes the weakened area 130. In at least one example, the weakened area 130 is a hole 172 formed through a portion of the extension segment 168. As another example, the weakened area 130 can be or otherwise include a partial perforation. As another example, the weakened area 130 can be one or otherwise include or more partial cuts. As another example, the weakened area 130 can be or otherwise include one or more recesses. As another example, the weakened area 130 can be or otherwise include portions that are thinner (that is, less thick) than other portions of the extension segment 168.

The ratchet segment 170 includes teeth 174 that are configured to cooperate with reciprocal teeth within the tether housing 162 of the retainer 114 (shown in FIG. 7). Referring to FIGS. 1 and 7, the ratchet segment 170 having the teeth 174 allows the ratchet segment 170 to be inserted into and through the inlet channel 163 and the outlet channel 165, but prevents the ratchet segment 170 from retreating out of the inlet channel 163. In at least one example, the ratchet segment 170 and the tether housing 162 are configured as a zip lock system.

Figure 9:
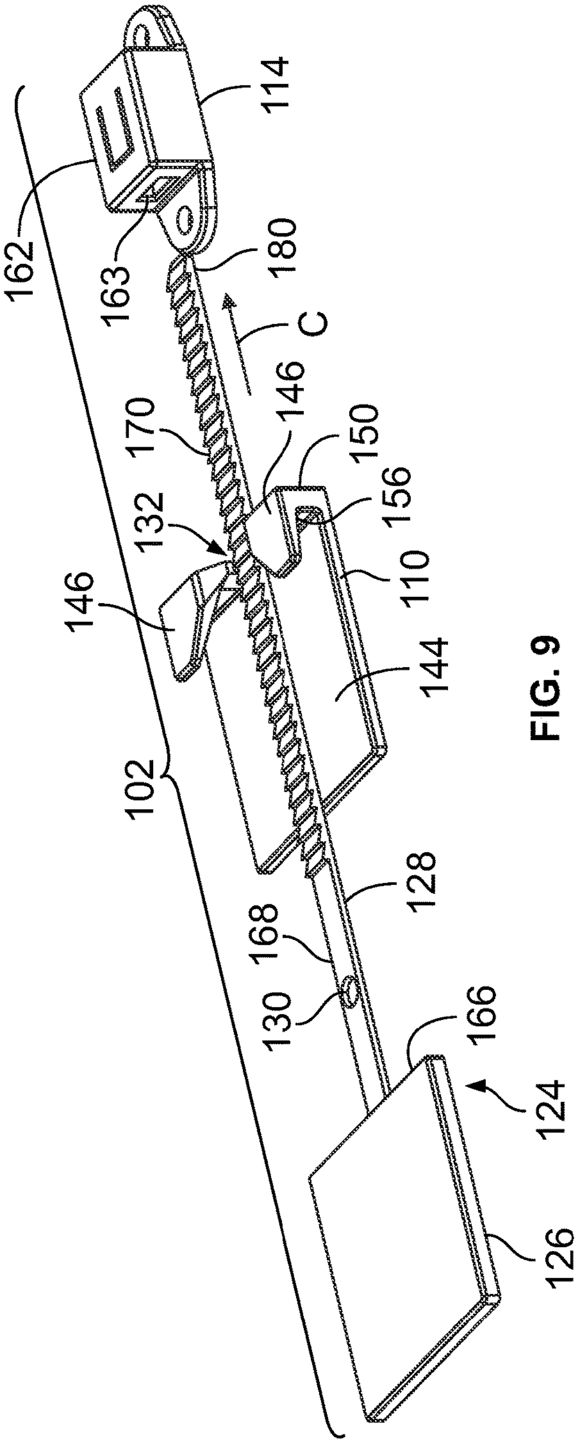
FIG. 9 illustrates an isometric view of the system for indicating tampering in a pre-set configuration.
Figure 10:
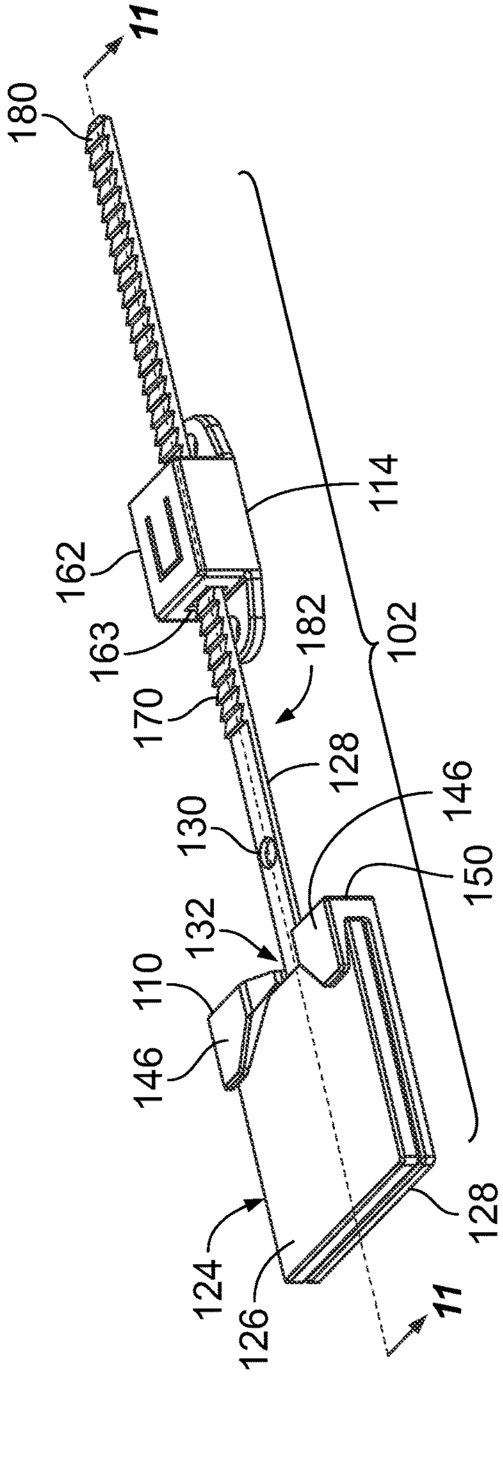
FIG. 10 illustrates an isometric view of the system for indicating tampering in a set configuration.

FIG. 9 illustrates an isometric view of the system 102 for indicating tampering in a pre-set configuration. FIG. 10 illustrates an isometric view of the system 102 for indicating tampering in a set configuration. Referring to FIGS. 1 and 6-10, the ratchet segment 170 is inserted into the inlet channel 163 in the direction of arrow C until the top edge 166 of the flag 126 abuts against inner surfaces of the extension beams 150 within the slots 156. In this position, the extension segment 168 of the tether 128 extends upwardly through the passage 132. A distal end 180 of the ratchet segment 170 is then further pulled in the direction of arrow C to continue to draw the ratchet segment 170 further through the retainer 114 and reduce slack in the tether 128 between the base 110 and the retainer 114. For example, the distal end 180 is pulled in the direction of arrow C until a portion 182 of the tether 128 between the base 110 and the retainer 114 conforms to an outer shape of a portion of the container 100 over which the portion 182 extends. As noted, the ratchet segment 170 cooperates with the reciprocal teeth within the retainer 114 to ensure that the ratchet segment 170 does not retreat out of the tether housing 162 in a direction that is opposite from arrow C. As such, the flag 126 is set within the base 110, and visible, thereby providing the undisturbed indication. For example, the flag 126 lies flat against the panel 144, and is visible below the retaining cuffs 146.

Figure 11:
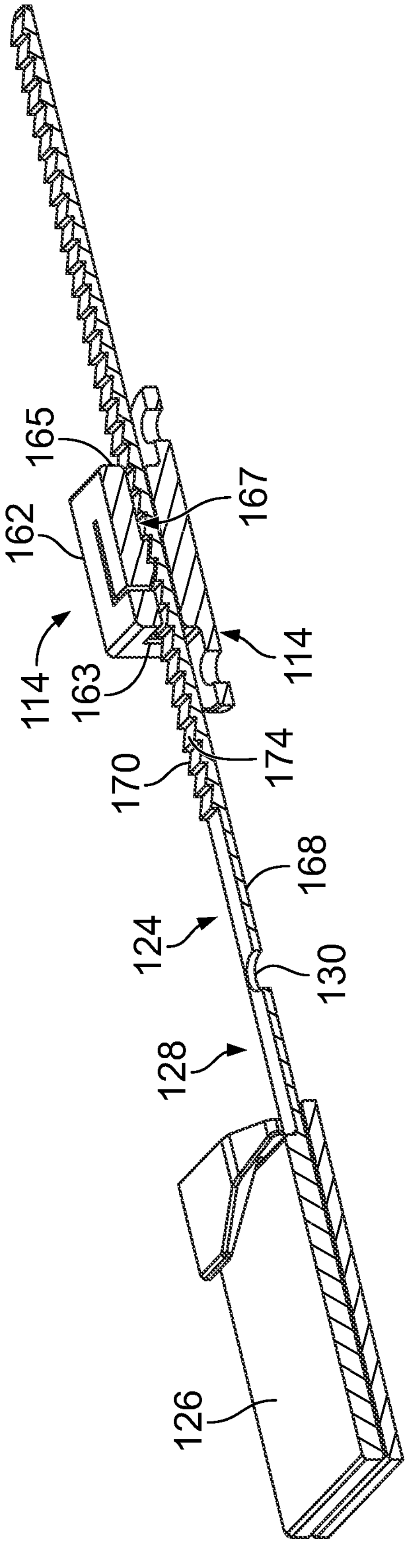
FIG. 11 illustrates an isometric cross-sectional view of the system for indicating tampering through line 11-11 of FIG. 10.
Figure 12:
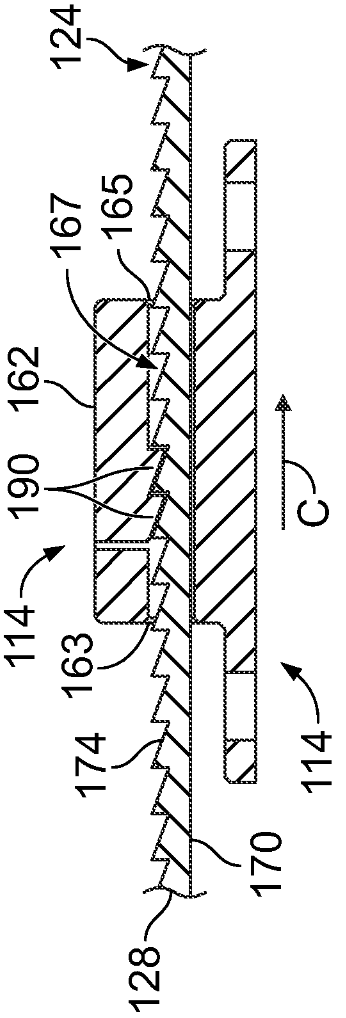
FIG. 12 illustrates a transverse cross-sectional view of a ratchet segment of a tether of the tamper indicator within the retainer housing.

FIG. 11 illustrates an isometric cross-sectional view of the system 102 for indicating tampering through line 11-11 of FIG. 10. FIG. 12 illustrates a transverse cross-sectional view of the ratchet segment 170 of the tether 128 of the tamper indicator 124 within the tether housing 162. As shown, the tether housing 162 includes an internal passage 167 that connects the inlet channel 163 to the outlet channel 165. The tether housing 162 also includes one or more reciprocal ratchet teeth 190 that extend into the internal passage 167 and cooperate and interlock with the teeth 174 of the ratchet segment 170 of the tether 128 to allow for passage into and through the tether housing 162, but prevent the ratchet segment 170 from retreating in an opposite direction.

Figure 13:
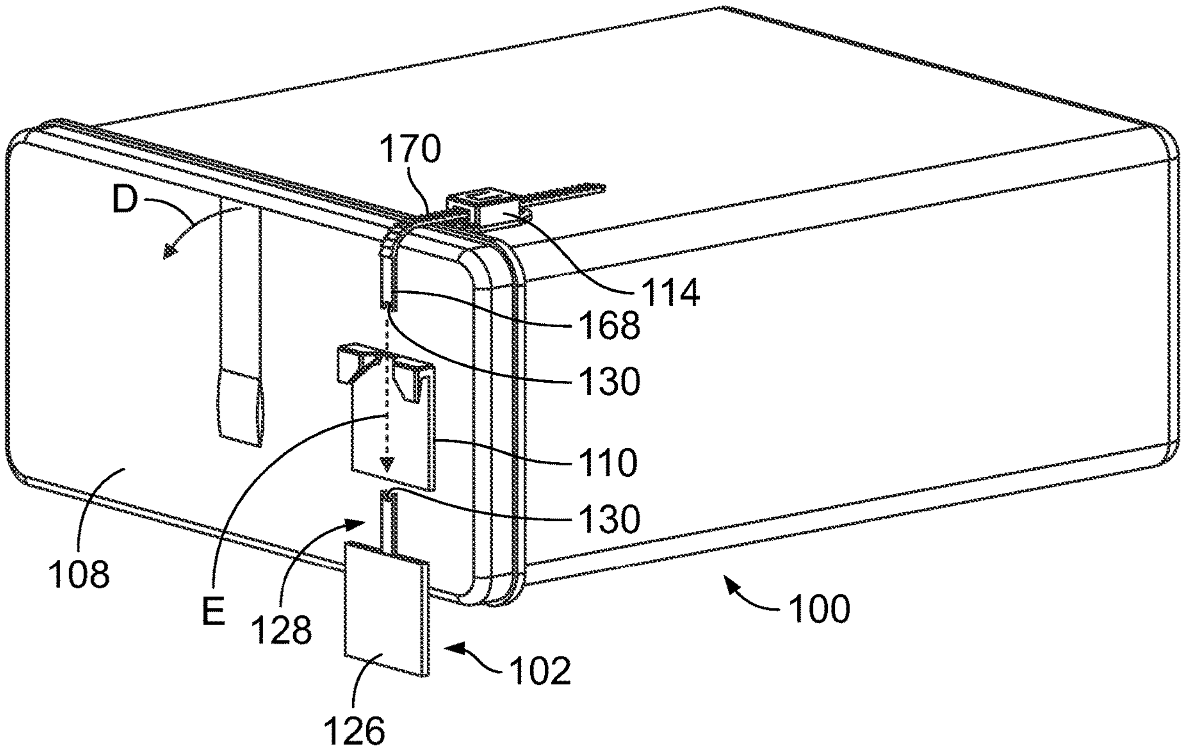
FIG. 13 illustrates an isometric side view of the container having the system for indicating tampering with a flag broken from a weakened area of a tether, according to an example of the present disclosure.

FIG. 13 illustrates an isometric side view of the container 100 having the system 102 for indicating tampering with a flag 126 broken from the weakened area 130 of the tether 128, according to an example of the present disclosure. When the door 108 is opened (either from being pulled outwardly and downwardly in the direction of arc D, or from being pulled outwardly and upwardly), the outward pivot of the door 108 increases tension in the tether 128 between the base 110 and the retainer 114. The increased tension causes a break in the tether 128 at the weakened area 130, thereby causing the flag 126 to separate from the tether 128 and drops from the base 110 in the direction of arrow E. The weakened area 130 provides a break point in the tether 128. Therefore, the flag 126 is no longer retained within the base 110. The base 110 without the flag 126 (that is, the flag 126 out of the base 110) provides the tampered indication.

In at least one example, the flag 126 can be a different color than the base 110, to provide a readily visible contrast therebetween. For example, the flag 126 can be red, and the base 110 can be grey or black. Optionally, the flag 126 and the base 110 can be the same color. As another example, the front face of the panel 144 can include an indication message such as via text, a graphic or the like denoting tampering. For example, the message can be text stating "tampered." Thus, when the flag 126 overlays the panel 144, the message, but when the flag 126 drops out of the base 110, the message is visible.

Further, the disclosure comprises examples according to the following clauses:

Certain examples of the present disclosure provide a system for indicating tampering of a container, the system comprising:

- a base configured to be secured to a door of the container;
- a retainer configured to be secured to a portion of a housing of the container; and
- a tamper indicator comprising:
  - a flag coupled to the base; and
  - a tether extending from the flag, wherein the tether is coupled to the retainer, wherein the tether includes a weakened area that is configured to break to separate the flag from the base in response to the door of the container being opened.

In at least one example, the base is configured to be secured to a front face of the door of the container.

In at least one example, the portion of the housing of the container is an outer surface of a top wall of the housing.

In at least one example, the flag coupled to the base provides an undisturbed indication, and wherein the base without the flag provides a tampered indication.

In at least one example, the container is a life vest box for an internal cabin of a vehicle, and wherein the life vest box is secured to a seat within the internal cabin.

In at least one example, the base comprises:

- a panel; and
- retaining cuffs outwardly extending from the panel, wherein each of the retaining cuffs includes an extension beam outwardly extending from the panel, and a retainer beam downwardly extending from the extension beam, wherein a slot is defined between the panel, the extension beam, and the retainer beam, wherein a passage separates the retaining cuffs, wherein the flag is secured by the panel and the retaining cuffs, and wherein a portion of the tether extends upwardly through the passage.

In at least one example, a front face of the panel includes an indication message denoting tampering.

In at least one example, the retainer comprises a tether housing having an inlet channel and an outlet channel opposite from the inlet channel, and wherein a portion of the tether is secured within the tether housing.

In at least one example, the tether comprises a ratchet segment, wherein the ratchet segment is configured to be moveably secured to the retainer, wherein the ratchet segment comprises teeth that cooperate with reciprocal teeth of the retainer.

A Certain examples of the present disclosure provide a container comprising:

- a housing defining an internal compartment for storing one or more items;
- a door moveably coupled to the container, wherein the door is configured to be moved from a closed position, in which the internal compartment is closed, and an open position, in which the internal compartment is accessible; and
- a system for indicating tampering of the container, the system comprising:
  - a base secured to the door of the container;
  - a retainer configured secured to a portion of the housing of the container; and
  - a tamper indicator comprising:
    - a flag coupled to the base; and
    - tether extending from the flag, wherein the tether is coupled to the retainer, wherein the tether includes a weakened area that is configured to break to separate the flag from the base in response to the door of the container being opened.

In at least one example, the base is secured to a front face of the door of the container.

In at least one example, the portion of the housing of the container is an outer surface of a top wall of the housing.

In at least one example, the flag coupled to the base provides an undisturbed indication, and wherein the base without the flag provides a tampered indication.

In at least one example, the container is a life vest box for an internal cabin of a vehicle, and wherein the life vest box is secured to a seat within the internal cabin.

In at least one example, the base comprises:

- a panel; and retaining cuffs outwardly extending from the panel, wherein each of the retaining cuffs includes an extension beam outwardly extending from the panel, and a retainer beam downwardly extending from the extension beam, wherein a slot is defined between the panel, the extension beam, and the retainer beam, wherein a passage separates the retaining cuffs, wherein the flag is secured by the panel and the retaining cuffs, and wherein a portion of the tether extends upwardly through the passage.

In at least one example, a front face of the panel includes an indication message denoting tampering.

In at least one example, the retainer comprises a tether housing having an inlet channel and an outlet channel opposite from the inlet channel, and wherein a portion of the tether is secured within the tether housing.

In at least one example, the tether comprises a ratchet segment, wherein the ratchet segment is configured to be moveably secured to the retainer, wherein the ratchet segment comprises teeth that cooperate with reciprocal teeth of the retainer.

Certain examples of the present disclosure provide a vehicle comprising:

- an internal cabin;
- a seat within the internal cabin; and
- a life vest box secured to the seat, wherein the life vest box comprises:
  - a housing defining an internal compartment for storing a life vest;
  - a door moveably coupled to the life vest box, wherein the door is configured to be moved from a closed position, in which the internal compartment is closed, and an open position, in which the internal compartment is accessible; and a system for indicating tampering of the life vest box, the system comprising:

a base secured to the door of the life vest box;

a retainer configured secured to a portion of the housing of the life vest box; and a tamper indicator comprising:

a flag coupled to the base; and a tether extending from the flag, wherein the tether is coupled to the retainer, wherein the tether includes a weakened area that is configured to break to separate the flag from the base in response to the door of the life vest box being opened.

In at least one example, the base is secured to a front face of the door of the life vest box, wherein the portion of the housing of the life vest box is an outer surface of a top wall of the housing, wherein the flag coupled to the base provides an undisturbed indication, and wherein the base without the flag provides a tampered indication.

As described herein, examples of the present disclosure provide efficient and effective systems and methods for indicating tampering of a container, such as a life vest box within an internal cabin of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first." "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for indicating tampering of a container, the system comprising:

a base configured to be secured to a door of the container, wherein the base comprises:

a panel; and retaining cuffs outwardly extending from the panel, wherein each of the retaining cuffs includes an extension beam outwardly extending from the panel, and a retainer beam downwardly extending from the extension beam, wherein a slot is defined between the panel, the extension beam, and the retainer beam, and wherein a passage separates the retaining cuffs;

a retainer configured to be secured to a portion of a housing of the container; and a tamper indicator comprising:

a flag coupled to the base, wherein the flag is secured by the panel and the retaining cuffs; and a tether extending from the flag, wherein the tether is coupled to the retainer, wherein the tether includes a weakened area that is configured to break to separate the flag from the base in response to the door of the container being opened, and wherein a portion of the tether extends upwardly through the passage.

2. The system of claim 1, wherein the portion of the housing of the container is an outer surface of a top wall of the housing.

3. The system of claim 1, wherein the flag coupled to the base provides an undisturbed indication, and wherein the base without the flag provides a tampered indication.

4. The system of claim 1, wherein the container is a life vest box for an internal cabin of a vehicle, and wherein the life vest box is secured to a seat within the internal cabin.

5. The system of claim 1, wherein a front face of the panel includes an indication message denoting tampering.

6. The system of claim 1, wherein the retainer comprises a tether housing having an inlet channel and an outlet channel opposite from the inlet channel, and wherein a portion of the tether is secured within the tether housing.

7. The system of claim 1, wherein the tether comprises a ratchet segment, wherein the ratchet segment is configured to be moveably secured to the retainer, and wherein the ratchet segment comprises teeth that cooperate with reciprocal teeth of the retainer.

8. The system of claim 1, wherein the base is configured to be secured to a front face of the door of the container.

9. A container comprising:

a housing defining an internal compartment for storing one or more items;

a door moveably coupled to the container, wherein the door is configured to be moved from a closed position, in which the internal compartment is closed, and an open position, in which the internal compartment is accessible; and a system for indicating tampering of the container, the system comprising:

a base secured to the door of the container, wherein the base comprises:

a panel; and retaining cuffs outwardly extending from the panel, wherein each of the retaining cuffs includes an extension beam outwardly extending from the panel, and a retainer beam downwardly extending from the extension beam, and wherein a slot is defined between the panel, the extension beam, and the retainer beam, wherein a passage separates the retaining cuffs;

a retainer configured secured to a portion of the housing of the container; and a tamper indicator comprising:

a flag coupled to the base, wherein the flag is secured by the panel and the retaining cuffs; and a tether extending from the flag, wherein the tether is coupled to the retainer, wherein the tether includes a weakened area that is configured to break to separate the flag from the base in response to the door of the container being opened, and wherein a portion of the tether extends upwardly through the passage.

10. The container of claim 9, wherein the portion of the housing of the container is an outer surface of a top wall of the housing.

11. The container of claim 9, wherein the flag coupled to the base provides an undisturbed indication, and wherein the base without the flag provides a tampered indication.

12. The container of claim 9, wherein the container is a life vest box for an internal cabin of a vehicle, and wherein the life vest box is secured to a seat within the internal cabin.

13. The container of claim 9, wherein the retainer comprises a tether housing having an inlet channel and an outlet channel opposite from the inlet channel, and wherein a portion of the tether is secured within the tether housing.

14. The container of claim 9, wherein the tether comprises a ratchet segment, wherein the ratchet segment is configured to be moveably secured to the retainer, and wherein the ratchet segment comprises teeth that cooperate with reciprocal teeth of the retainer.

15. The container of claim 9, wherein a front face of the panel includes an indication message denoting tampering.

16. A vehicle comprising:

an internal cabin;

a seat within the internal cabin; and a life vest box secured to the seat, wherein the life vest box comprises:

a housing defining an internal compartment for storing a life vest;

a door moveably coupled to the life vest box, wherein the door is configured to be moved from a closed position, in which the internal compartment is closed, and an open position, in which the internal compartment is accessible; and a system for indicating tampering of the life vest box, the system comprising:

a base secured to a front face of the door of the life vest box, wherein the base comprises:

a panel; and retaining cuffs outwardly extending from the panel, wherein each of the retaining cuffs includes an extension beam outwardly extending from the panel, and a retainer beam downwardly extending from the extension beam, wherein a slot is defined between the panel, the extension beam, and the retainer beam, and wherein a passage separates the retaining cuffs;

a retainer configured secured to a portion of the housing of the life vest box; and a tamper indicator comprising:

a flag coupled to the base, wherein the flag is secured by the panel and the retaining cuffs; and a tether extending from the flag, wherein the tether is coupled to the retainer, wherein the tether includes a weakened area that is configured to break to separate the flag from the base in response to the door of the life vest box being opened, and wherein a portion of the tether extends upwardly through the passage.

17. The vehicle of claim 16, wherein the portion of the housing of the life vest box is an outer surface of a top wall of the housing, wherein the flag coupled to the base provides an undisturbed indication, and wherein the base without the flag provides a tampered indication.

18. The system of claim 16, wherein the tether comprises a ratchet segment, wherein the ratchet segment is configured to be moveably secured to the retainer, wherein the ratchet segment comprises teeth that cooperate with reciprocal teeth of the retainer.

19. The vehicle of claim 16, wherein a front face of the panel includes an indication message denoting tampering.

20. A system for indicating tampering of a container, the system comprising:

a base configured to be secured to a door of the container;

a retainer configured to be secured to a portion of a housing of the container; and a tamper indicator comprising:

a flag coupled to the base; and a tether extending from the flag, wherein the tether is coupled to the retainer, wherein the tether includes a weakened area that is configured to break to separate the flag from the base in response to the door of the container being opened, wherein the tether comprises a ratchet segment, wherein the ratchet segment is configured to be moveably secured to the retainer, and wherein the ratchet segment comprises teeth that cooperate with reciprocal teeth of the retainer.

* * * * *